United States Patent
Mia

(10) Patent No.: US 10,710,713 B2
(45) Date of Patent: Jul. 14, 2020

(54) VERTICAL TAKE-OFF AND LANDING AIRCRAFT

(71) Applicant: PEGASUS UNIVERSAL AEROSPACE (PTY) LTD., Johannesburg (ZA)

(72) Inventor: Mohamed Reza Mia, Johannesburg (ZA)

(73) Assignee: PEGASUS UNIVERSAL AEROSPACE (PTY) LTD., Johannesburg (ZA)

( * ) Notice: Subject to any disclaimer, the term of this patent is extended or adjusted under 35 U.S.C. 154(b) by 326 days.

(21) Appl. No.: 15/327,237

(22) PCT Filed: Jul. 16, 2015

(86) PCT No.: PCT/IB2015/055376
§ 371 (c)(1),
(2) Date: Jan. 18, 2017

(87) PCT Pub. No.: WO2016/009376
PCT Pub. Date: Jan. 21, 2016

(65) Prior Publication Data
US 2017/0158321 A1     Jun. 8, 2017

(30) Foreign Application Priority Data
Jul. 18, 2014  (ZA) .................................. 2014/05312

(51) Int. Cl.
*B64C 29/00* (2006.01)
*B64D 27/20* (2006.01)
(Continued)

(52) U.S. Cl.
CPC ........ *B64C 29/005* (2013.01); *B64C 29/0025* (2013.01); *B64C 29/0058* (2013.01);
(Continued)

(58) Field of Classification Search
CPC ......... B64C 27/20; B64C 27/22; B64C 27/26; B64C 29/00; B64C 29/0008;
(Continued)

(56) References Cited

U.S. PATENT DOCUMENTS 1,130,623 A    3/1915 Mustonen
3,088,694 A    5/1963 Stirgwolt
(Continued)

FOREIGN PATENT DOCUMENTS

JP    H02283821 A    11/1990
WO    2006/113877 A2    10/2006
WO    WO-2016009376 A1 * 1/2016 ......... B64C 29/0025

OTHER PUBLICATIONS

International Search Report and Written Opinion for corresponding PCT/IB2015/055376, dated Nov. 4, 2016 (10 pages).

*Primary Examiner* — Benjamin P Lee
(74) *Attorney, Agent, or Firm* — McCarter & English, LLP; David R. Burns

(57) ABSTRACT

A vertical take-off and landing (VTOL) aircraft is provided comprising a fuselage (12) defining a forward end and an aft end, the fuselage accommodating at least one engine (56), a left wing (18) and a right wing (20) extending from either side of the fuselage, a lift fan drive system (22) accommodated within each wing, a forward thrust fan drive system (24) fitted proximate the aft end of the fuselage, and a stabiliser arrangement (26) proximate the forward thrust fan drive system. In an embodiment, each wing comprises a rotor housing portion (18.1, 20.1) extending away from the fuselage and a wing tip portion (18.2, 20.2) extending away from the rotor housing portion, the wing tip portion being angled towards the rear and side of the aircraft. In an embodiment, the rotor housing portion comprises two rotor (Continued)

housings, one forward of the aircraft's centre of gravity and one aft of the aircraft's centre of gravity.

8 Claims, 6 Drawing Sheets

(51) Int. Cl.
  *B64C 39/08* (2006.01)
  *B64D 35/04* (2006.01)
  *B64D 35/08* (2006.01)
(52) U.S. Cl.
  CPC .......... *B64C 29/0066* (2013.01); *B64C 39/08* (2013.01); *B64D 27/20* (2013.01); *B64D 35/04* (2013.01); *B64D 35/08* (2013.01)
(58) Field of Classification Search
  CPC .............. B64C 29/0016; B64C 29/005; B64C 29/0058; B64C 29/0025; B64C 29/0066; B64C 39/08; B64D 35/04; B64D 35/08; B64D 27/20
  See application file for complete search history.

(56) References Cited

U.S. PATENT DOCUMENTS

| | | | |
|---|---|---|---|
| 3,122,343 A * | 2/1964 | Leibach | B64C 29/0025 244/23 B |
| 3,249,323 A * | 5/1966 | Vanderlip | B64C 29/0025 244/12.3 |
| 4,469,294 A * | 9/1984 | Clifton | B64C 29/0025 244/10 |
| 4,828,203 A * | 5/1989 | Clifton | B64C 29/0025 244/12.3 |
| 6,561,456 B1 * | 5/2003 | Devine | B64C 29/0025 244/12.1 |
| 6,843,477 B2 | 1/2005 | Morgan | |
| D665,333 S * | 8/2012 | Oliver | D12/326 |
| 8,382,030 B2 * | 2/2013 | Kosheleff | B64C 29/0025 244/23 B |
| 8,636,241 B2 * | 1/2014 | Lugg | B64C 29/0025 244/12.1 |
| 9,676,479 B2 * | 6/2017 | Brody | B64C 29/0033 |
| 9,714,090 B2 * | 7/2017 | Frolov | G08G 5/0021 |
| 10,131,426 B2 * | 11/2018 | Judas | B64C 29/0025 |
| 2004/0144890 A1 * | 7/2004 | Mao | B64C 29/0025 244/12.5 |
| 2004/0245374 A1 * | 12/2004 | Morgan | B64C 5/02 244/12.3 |
| 2007/0034739 A1 * | 2/2007 | Yoeli | B64C 1/1415 244/23 R |
| 2008/0169375 A1 * | 7/2008 | Ishikawa | B64C 29/0025 244/12.1 |
| 2012/0012692 A1 * | 1/2012 | Kroo | B64C 3/56 244/6 |
| 2012/0056034 A1 * | 3/2012 | Kosheleff | B64C 29/0025 244/58 |
| 2012/0280091 A1 * | 11/2012 | Saiz | B64C 27/26 244/7 R |
| 2013/0062455 A1 * | 3/2013 | Lugg | B64C 29/0025 244/12.3 |
| 2018/0141652 A1 * | 5/2018 | Deslypper | B64C 3/54 |

* cited by examiner

VERTICAL TAKE-OFF AND LANDING AIRCRAFT

RELATED APPLICATIONS

This application is a 35 U.S.C. § 371 national stage filing of International Application No. PCT/IB2015/055376, filed on Jul. 16, 2015, which claims priority to South African Patent Application No. 2014/05312, filed on Jul. 18, 2014. The entire contents of each of the foregoing applications are incorporated herein by reference.

FIELD OF THE INVENTION

The present invention relates generally to aircraft, and more specifically to a vertical take-off and landing aircraft having the take-off and hover capabilities similar to a helicopter and the performance and range capabilities similar to a regional business jet.

BACKGROUND TO THE INVENTION

Vertical take-off and landing (VTOL) aircraft, as such, are not new. Two of the more successful VTOL aircraft are briefly described below:
1. The first VTOL aircraft uses a tilt-rotor design, wherein a tilt-rotor is fitted to the end of each wing. The tilt-rotor is movable between a vertical position, for providing lift for vertical takeoff, and a horizontal position, for providing forward thrust for normal flight. A successful example of the above is the US military's "Osprey" aircraft.
2. The second VTOL aircraft uses thrust augmentation and engine compressor bleed aft, in which thrust produced by turbofan/jet engines and engine compressor bleed air is redirected (i.e. augmented) downwardly to achieve vertical take-off. The most successful example of such a design is the British military's AV8 Harrier fighter jet.

Yet a further example of a VTOL aircraft, which the VTOL of the present invention is more closely aligned to, is the Vanguard Omniplane, which was an experimental aircraft program which ran from 1959 to 1962. Vertical lift was achieved through two in-wing three bladed fans, and forward flight was achieved using a shrouded rear propeller. The aircraft also featured covers and closing louvers on the top and bottom of the wings, respectively, to close off the fans and thereby improve aerodynamics during forward flight. This aircraft had inherent stability and control problems, and during testing the aircraft was damaged and the project abandoned.

There remains a need for a VTOL aircraft that is inherently stable, and which has the hover, landing and vertical take-off performance of a helicopter and has the performance and range of a regional business jet.

SUMMARY OF THE INVENTION

According to the invention there is provided a vertical take-off and landing (VTOL) aircraft comprising:
a fuselage defining a forward end and an aft end, the fuselage accommodating at least one engine;
a left wing and a right wing extending from either side of the fuselage:
a lift fan drive system accommodated within each wing;
a forward thrust fan drive system fitted proximate the aft end of the fuselage; and
a stabiliser arrangement proximate the forward thrust fan drive system.

In an embodiment, each wing comprises a rotor housing portion extending away from the fuselage and a wing tip portion extending away from the rotor housing portion, the wing tip portion being angled towards the rear and side of the aircraft.

In an embodiment, the rotor housing portion comprises two rotor housings, one forward of the aircraft's centre of gravity and one aft of the aircraft's centre of gravity.

In an embodiment, each rotor housing accommodates a lift fan with variable pitch blades, the lift fan forming part of the lift fan drive system.

In an embodiment, the aircraft comprises a stability system having a plurality of inputs, including that of a pilot, and a plurality of actuating outputs. One of the actuating outputs is to control the angular pitch of the blades of the lift fans, with the change in pitch of the fan blades varying the vertical thrust provided by each fan.

For the purposes of this invention, 'pilot' is meant to include a remote pilot and an autopilot.

In an embodiment, a lower opening of each rotor housing is fitted with a series of louvers, the louvers being orientated and angled during flight to redirect the thrust generated by the lift fans. The louvers are controlled by the stability system, based on the pilot's inputs and stability sensor inputs into the stability system.

In an embodiment, an upper opening of each rotor housing is fitted with a sealing arrangement to seal off the upper opening, which is under the control of the pilot and flight management system.

In an embodiment, the forward thrust fan drive system comprises two forward thrust ducted fans, the fans being accommodated within a cowling that is fitted on either side of the fuselage tail.

In an embodiment, the length of the fuselage and the wingspan of the aircraft are similar.

In an embodiment, the stabiliser arrangement comprises a horizontal stabiliser extending from each cowling that accommodates one of the forward thrust ducted fans, and a vertical stabiliser that extends from each cowling.

In an embodiment, the stabiliser arrangement may include canards.

In an embodiment, the fuselage comprises multiple turbine engines, with power being transferred from each of the engines to each of the lift fans of the lift fan drive systems through a single planetary gearbox, the multiple turbine engines also being used to power the forward thrust fan drive system through a secondary gearbox.

DETAILED DESCRIPTION OF THE INVENTION

Figure 1:
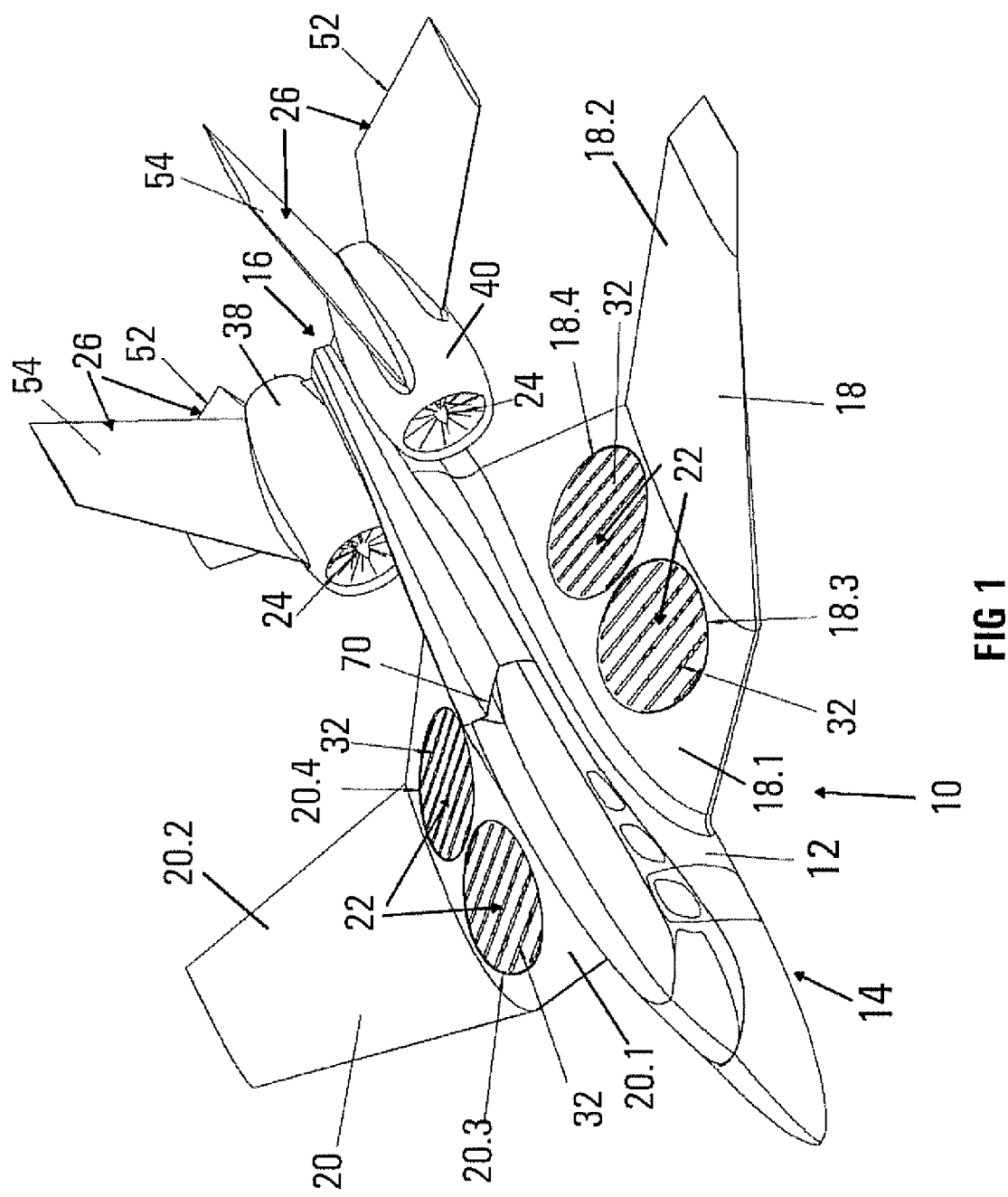
FIG. 1 shows a perspective view of a VTOL aircraft according to the present invention.

With reference now to the drawings, there is provided a vertical take-off and landing (VTOL) aircraft 10 comprising a blended body, pressurised fuselage 12 defining a forward end 14 and an aft end 16.

The aircraft 10 further comprises a left wing 18 and a right wing 20 extending from either side of the fuselage 12.

A lift fan drive system 22 is accommodated within each wing 18, 20, and a forward thrust fan drive system 24 is fitted proximate the aft end 16 of the fuselage 12.

A stabiliser arrangement 26 is fitted proximate the forward thrust fan drive system 24 at the aft end 16 of the aircraft 10.

Figure 2:
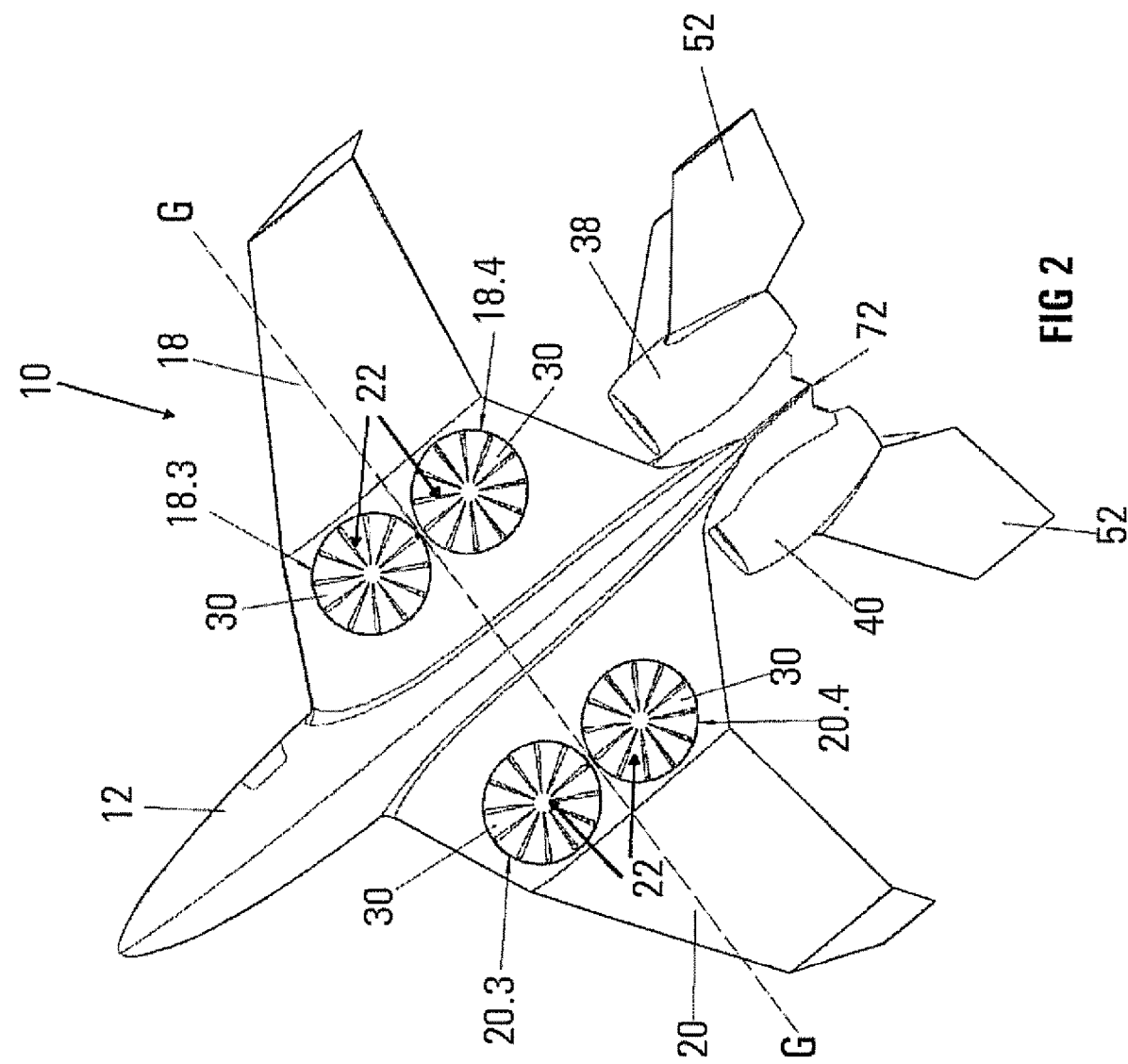
FIG. 2 shows a bottom view of the VTOL aircraft shown in FIG. 1.

In an embodiment, each wing 18, 20 comprises a rotor housing portion 18.1, 20.1 extending away from the fuselage 12 and a wing tip portion 18.2, 20.2 extending away from the rotor housing portion 18.1, 20.1, respectively, the wing tip portion 18.2, 20.2 being angled towards the rear and side of the aircraft 10 (as best shown in FIG. 2).

In an embodiment, the rotor housing portion 18.1, 20.1 comprises two rotor housings 18.3, 18.4 and 20.3, 20.4, respectively, with rotor housings 18.3 and 20.3 being forward of the aircraft's centre of gravity (indicated by line G-G in FIG. 2) and rotor housings 18.4, 20.4 being aft of the aircraft's centre of gravity.

Figure 4:
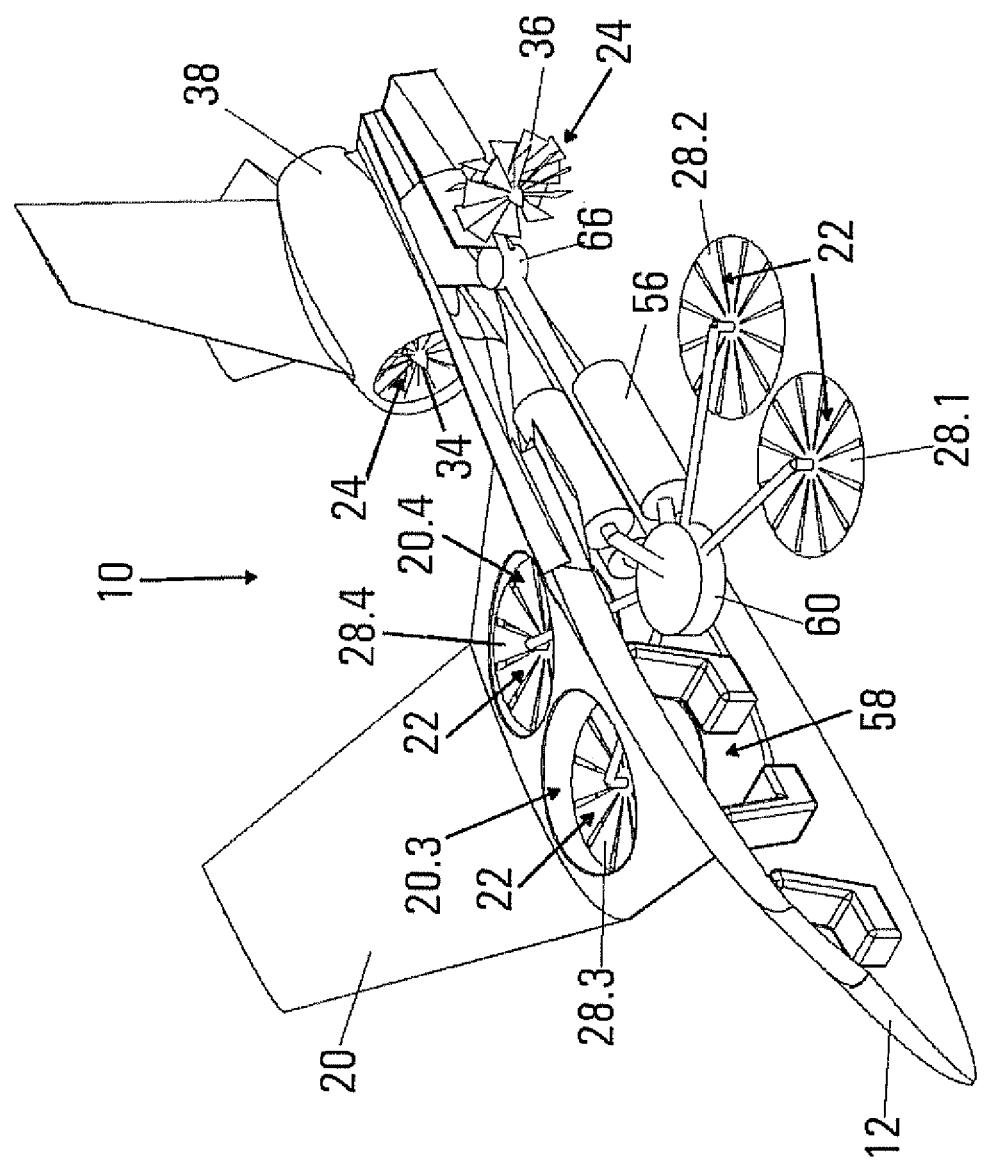
FIG. 4 shows a partially cutaway perspective of the VTOL aircraft of the present invention, in which a portion of the fuselage has been cutaway and the left wing removed.

As best shown in FIG. 4, each rotor housing 18.3, 18.4, 20.3, 20.4 accommodates a lift fan 28.1, 28.2, 28.3 and 28.4, respectively, with variable pitch blades, the lift fans 28.1, 28.2, 28.3 and 28.4 forming part of the lift fan drive system 22.

In an embodiment, the altitude and movement of the aircraft 10 is controlled and managed using a computer controlled stability system. The system has a plurality of inputs, including at least one gyroscopic sensing system and flight control inputs from a pilot, and a processor to generate a plurality of actuating outputs to make the necessary adjustments to the engine throttle, variable pitch blades, power distribution mechanisms, and aerodynamic control surfaces to ensure the aircraft 10 moves in the desired direction.

One of the actuating outputs is to control the angular pitch of the blades of the lift fans 28.1, 28.2, 28.3 and 28.4, with the change in pitch of the fan blades varying the vertical thrust provided by each fan 28.1, 28.2, 28.3 and 28.4. The ability to change the angular orientation of the blades of each lift fan 28.1, 28.2, 28.3 and 28.4 allows the aircraft 10 to adjust the thrust output at a constant angular velocity of each fan 28.1, 28.2, 28.3 and 28.4 and affords control of the aircraft 10. Variable pitch fan blades are well known in the art and need not be explained in further detail.

The stability system operates in an automated manner, thereby eliminating any danger and reducing pilot workload during vertical take-off and transition to forward flight. The aircraft 10 is capable of vertical take-off and landing, hover, transition to forward flight and obtaining high speed flight at Regional Aircraft operating altitudes. At least one gyroscope measures pitch, yaw or roll and provides this information, as an input, to the computer controlled stability system. This information along with pilot inputs to the system allows it to compute and make the necessary adjustments to all the control and power mechanisms mentioned above and provide for safe and controlled motion of the aircraft 10.

In an embodiment, a lower opening of each rotor housing 18.3, 18.4, 20.3, 20.4, as best shown in FIG. 2, is fitted with a series of movable louvers 30, the louvers 30 being orientated and angled during flight to redirect the thrust generated by the lift fans 28.1, 28.2, 28.3 and 28.4.

The louvers 30 are controlled by the computer controlled stability system, based on the pilot's inputs and stability sensor inputs into the stability system, as described above.

Figure 3:
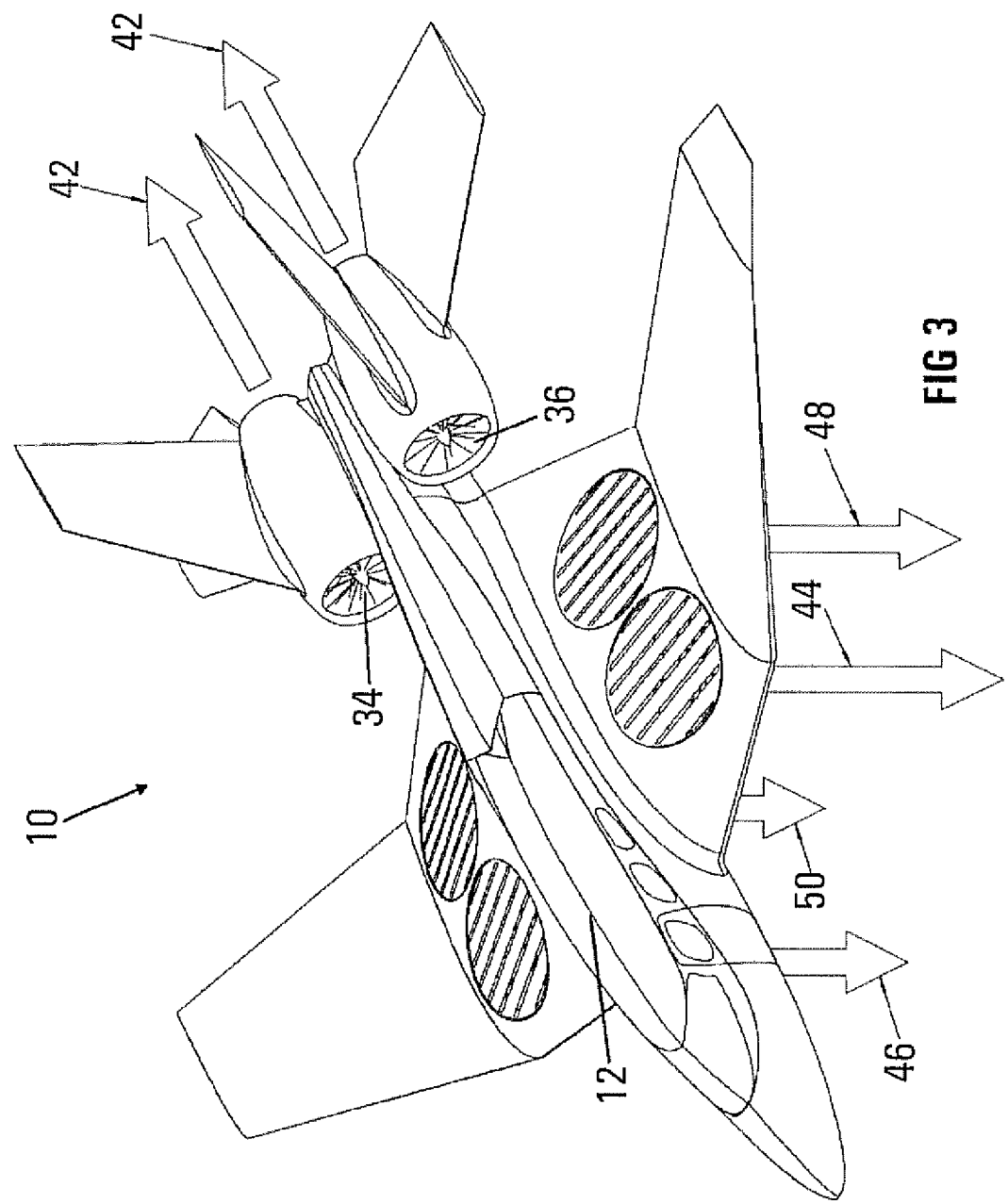
FIG. 3 shows a perspective view of the VTOL aircraft of the present invention, illustrating the thrust path of a lift fan drive system and a forward thrust fan drive system.

In an embodiment, as best shown in FIGS. 1 and 3, an upper opening of each rotor housing 18.3, 18.4, 20.3, 20.4 is fitted with a sealing arrangement 32 to seal off the upper opening, which is under the control of the pilot and flight management system. In FIG. 4, the sealing arrangement 32 have been removed, so as to better show the lift fans 28.1, 28.2, 28.3 and 28.4. During forward flight, for example, the louvers 30 and the sealing arrangement 32 (i.e. both below and above the lift fans 28.1, 28.2, 28.3 and 28.4) may be closed, so as to improve aerodynamics over the wings 18, 20. Conversely, the louvers 30 and the sealing arrangement 32 may be opened to allow airflow through the lift fans 28,1, 28.2, 28,3 and 28.4 during vertical take-off, vertical landing and transition.

Figure 5:
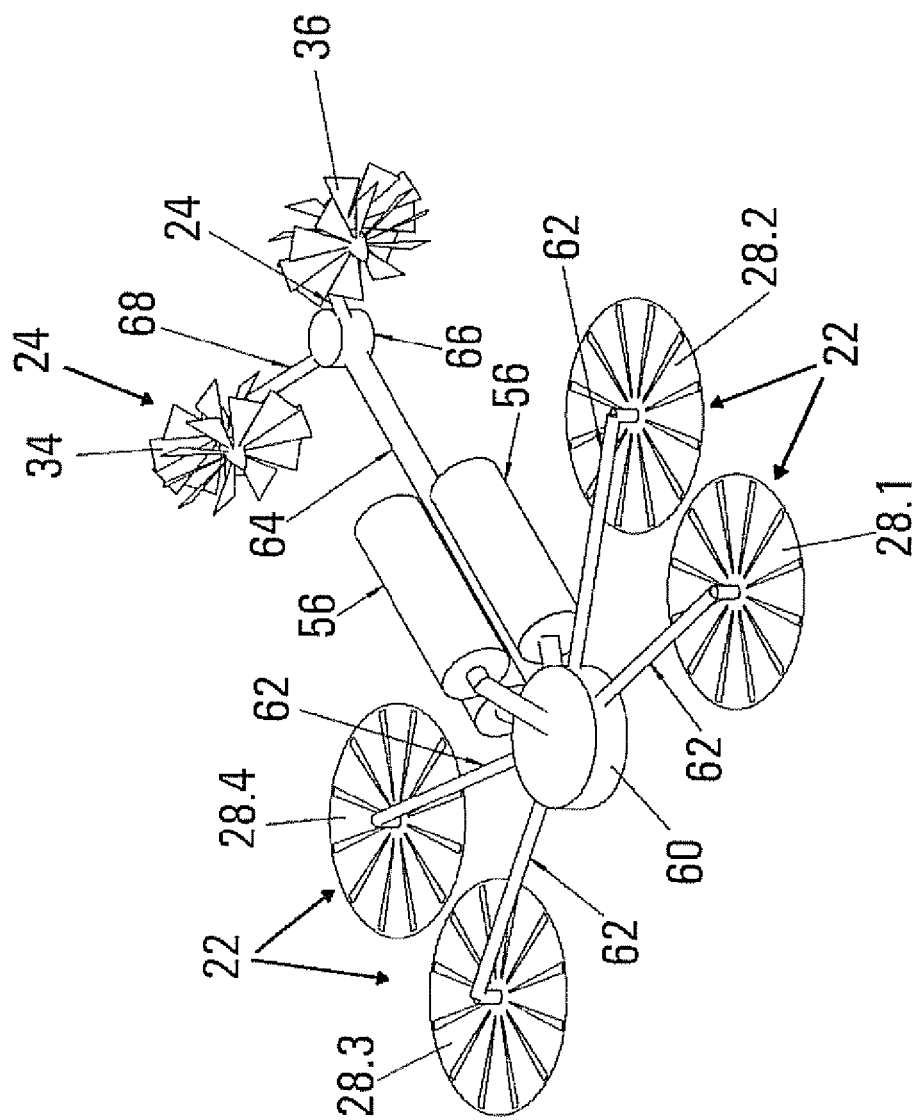
FIG. 5 shows a perspective view of the lift fan drive system and the forward thrust fan drive system of the VTOL aircraft of the present invention.

As best shown in FIGS. 4 and 5, the forward thrust fan drive system 24 comprises two forward thrust ducted, multi stage compression fans 34, 36. The fans 34, 36 are each accommodated within a cowling 38, 40 that is fitted on either side of the tail of the fuselage 12, behind the wings 18, 20. The fans 34, 36 are optimised for high speed flight at Regional Aircraft operating altitudes.

Turning now to FIG. 3, the thrust vectors generated by the lift fans 28.1, 28.2, 28.3 and 28.4 of the lift fan drive system 22 and the forward thrust ducted fans 34, 36 of the forward thrust fan drive system 24 are shown. In particular, a forward thrust vector 42 of each forward thrust ducted fan 34, 36 points horizontal and to the rear of the fuselage 12. A front left thrust vector 44 of the front left lift fan 28.1 points downward relative to the fuselage 12 and a front right thrust vector 46 of the front right lift fan 28.3 points downward relative to the fuselage 12. A rear left thrust vector 48 of the rear left lift tan 28.2 points downward relative to the fuselage 12 and a rear right thrust vector 50 of the rear right lift fan 28.4 points downward relative to the fuselage 12. The angulations of the thrust of all four lift fans 28.1, 28.2, 28.3 and 28.4 are independently variable, based on the orientation of the thrust directing louvers 30 beneath the four rotor housings contained in each wing 18, 20, as illustrated in FIG. 2. This coupled with the variable thrust due to the variable pitch fan blades allows for full control of the aircraft 10 in the vertical take-off, hover, transition and vertical landing phases of flight. The combinations of the pitch of each blade of the lift fans 28.1, 28.2, 28.3 and 28.4 and the direction of each fan thrust allows for control of pitch, roll, yaw and forward, aft and lateral movement.

The length of the fuselage and the wingspan of the aircraft are similar, and within the size limits of standard helicopter landing pads.

Due to the shorter than usual fuselage, a larger than conventional horizontal stabilising force may be required to control pitch. To address this, in one version, the stabiliser arrangement 26 comprises a horizontal stabiliser 52 extending rearwardly and sidewardly from the rear of each cowling 38, 40, and a V-tail vertical stabiliser 54 that extends vertically and sidewardly (i.e. at an outward angle) from the rear of each cowling 38, 40. In another version, the stabiliser arrangement 26 may include canards (not shown), but which may in turn require the horizontal and vertical stabilisers to be re-designed in order to account for a variable mass in the passenger/cargo area of the aircraft and its effect on centre of gravity movement.

The aircraft 10 includes a combined power plant for powering the lift fan drive system 22 and the forward thrust fan drive system 24. As best shown in FIGS. 4 and 5, the fuselage 12 accommodates multiple turbine engines 56 behind the passenger cabin 58, towards the tail section of the fuselage 12. The power is transferred from the engines 56 to each of the lift fans 28.1, 28.2, 28.3 and 28.4 of the lift fan drive system 22 through a single primary planetary gearbox 60, which is positioned in front of the engines 56, typically via a clutch (not shown) and drive shafts 62.

This arrangement allows redundancy should one engine 56 fail. Thus, if any one of the engines 56 fail, the engine 56 may be disengaged through a clutch (not shown), with the remaining engines 56 being capable of providing enough power to the aircraft 10 to perform a vertical landing, thereby providing redundancy to the system.

The multiple turbine engines 56 are also used to power the forward thrust fan drive system 24 through the primary planetary gearbox 60, a driveshaft 64, a secondary splitter gearbox 66, and secondary drive shafts 68. In one version, power to the forward thrust ducted fans 34, 36 can be engaged and disengaged through a clutch (not shown) during the transition between forward and vertical flight. Again, the computer controlled stability system is used to control the gradual power transfer between the lift fan drive system 22 and the forward thrust fan drive system 24. Alternatively, this may be addressed through the use of variable pitch blades for forward thrust, in which the blades are pitched fine during vertical take-off and then increase during transition.

Figure 6:
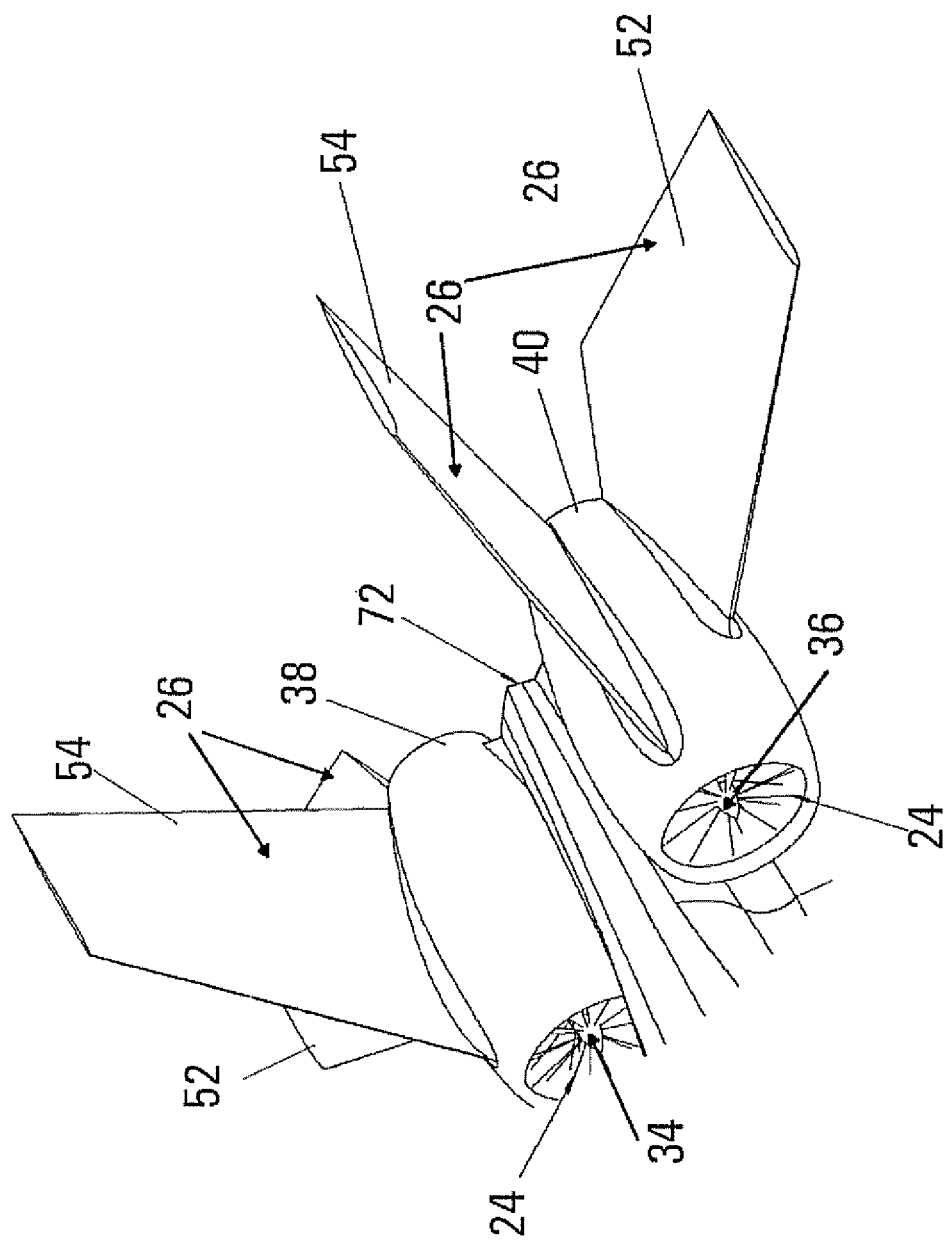
FIG. 6 shows an enlarged perspective view of the tail portion of the VTOL aircraft of the present invention, showing in particular the stabilisers of the VTOL aircraft.

The engines 56 have an air-inlet 70 (FIG. 1) positioned above the fuselage 12. Exhausted gases are expelled through the exhaust outlet 72 (FIGS. 2 and 6) positioned at the rear of the fuselage 12, in between the forward thrust ducted fans 34 and 36.

The invention claimed is:

1. A vertical take-off and landing (VTOL) aircraft comprising:
a fuselage defining a forward end and an aft end, the fuselage accommodating at least one engine;
a left wing and a right wing extending from either side of the fuselage, each wing comprising a rotor housing portion extending away from the fuselage and a wing tip portion extending away from the rotor housing portion, the wing tip portion being angled towards a rear and side of the aircraft, wherein each of the rotor housing portions comprises two rotor housings, one forward of the aircraft's centre of gravity and one aft of the aircraft's centre of gravity;
a lift fan drive system accommodated within each wing;
a forward thrust fan drive system fitted proximate the aft end of the fuselage;
a stabiliser arrangement proximate the forward thrust fan drive system, and
a stability system having a plurality of inputs, including that of a pilot, and a plurality of actuating outputs,
wherein the at least one engine is arranged to power both the lift fan drive system and the forward thrust fan drive system, the at least one engine defining a combined power plant within the fuselage, wherein each the rotor housing portions accommodates a lift fan with variable pitch blades, the lift fan forming part of the lift fan drive system,
wherein a lower opening of each of the rotor housings is fitted with a series of louvers, the louvers being orientated and angled during flight to redirect thrust generated by the lift fans, the louvers being controlled by the stability system, based on the pilot's inputs and stability sensor inputs into the stability system, with angulations of the thrust of the lift fans being independently variable based on an orientation of the thrust directing louvers, which, in combination with a variable thrust due to the variable pitch fan blades allows for full control of the aircraft in the vertical take-off, hover, transition and vertical landing phases of flight.

2. The aircraft of claim 1, wherein one of the actuating outputs is to control an angular pitch of the blades of the lift fans, with the change in pitch of the fan blades varying a vertical thrust provided by each fan.

3. The aircraft of claim 1, wherein an upper opening of each rotor housing is fitted with a sealing arrangement to seal off the upper opening, which is under a control of the pilot and flight management system.

4. The aircraft of claim 1, wherein the forward thrust fan drive system comprises two forward thrust ducted fans, the fans being accommodated within a cowling that is fitted on either side of a fuselage tail, behind the wings.

5. The aircraft of claim 4, wherein the stabiliser arrangement comprises a horizontal stabiliser extending rearwardly and sidewardly from a rear of each cowling that accommodates one of the forward thrust ducted fans, and an angled stabiliser that extends vertically and sidewardly from the rear of each cowling.

6. The aircraft of claim 4, wherein the stabiliser arrangement includes canards.

7. The aircraft of claim 1, wherein the fuselage comprises multiple turbine engines, with power being transferred from each of the engines to each of the lift fans of the lift fan drive system through a single planetary gearbox, which is positioned in front of the engines and wherein drive shafts extend between the single planetary gearbox and each lift fan drive system, the multiple turbine engines also being used to power the forward thrust fan drive system through a secondary gearbox, wherein a drive shaft extends between the single planetary gearbox and the secondary gearbox.

8. The aircraft of claim 1, wherein the length of the fuselage and a wingspan of the aircraft are substantially similar.

* * * * *